US012326230B2

(12) United States Patent
Bai et al.

(10) Patent No.: US 12,326,230 B2
(45) Date of Patent: Jun. 10, 2025

(54) LIGHT-EMITTING MODULE AND VEHICLE

(71) Applicant: VALEO VISION, Bobigny (FR)

(72) Inventors: Lu Bai, Wuhan (CN); Liubo Wang, Wuhan (CN); Lei Fan, Wuhan (CN); Zhi Zhong, Wuhan (CN); Ling Dai, Wuhan (CN)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 18/574,250

(22) PCT Filed: Jun. 24, 2022

(86) PCT No.: PCT/EP2022/067446
§ 371 (c)(1),
(2) Date: Dec. 26, 2023

(87) PCT Pub. No.: WO2023/274897
PCT Pub. Date: Jan. 5, 2023

(65) Prior Publication Data

US 2024/0328590 A1 Oct. 3, 2024

(30) Foreign Application Priority Data

Jun. 30, 2021 (CN) ......................... 202110740998.9
Jun. 30, 2021 (CN) ......................... 202121476873.1

(51) Int. Cl.
*F21S 41/32* (2018.01)
*F21S 41/148* (2018.01)
(Continued)

(52) U.S. Cl.
CPC ........... *F21S 41/321* (2018.01); *F21S 41/148* (2018.01); *F21S 43/14* (2018.01);
(Continued)

(58) Field of Classification Search
CPC ........ F21S 41/321; F21S 41/148; F21S 43/14; F21S 43/26231; F21S 43/31; F21Y 2115/10
See application file for complete search history.

(56) References Cited

U.S. PATENT DOCUMENTS

2009/0168428 A1 7/2009 Huang
2014/0226355 A1 8/2014 Blandin et al.
(Continued)

FOREIGN PATENT DOCUMENTS

EP 3 343 091 A1 7/2018
EP 3 805 634 A1 4/2021
(Continued)

OTHER PUBLICATIONS

International Search Report Issued Sep. 28, 2022, in PCT/EP2022/067446, filed on Jun. 24, 2022, 4 pages.
(Continued)

*Primary Examiner* — Elmito Breval
(74) *Attorney, Agent, or Firm* — Oblon, McClelland, Maier & Neustadt, L.L.P.

(57) ABSTRACT

A light-emitting module and a vehicle, the light-emitting module having a main light exit direction. The light-emitting module includes a first light source, used for a first light function, a first reflector for receiving and reflecting light emitted from the first light source. A second light source is used for a second light function, and a second reflector is for receiving and reflecting light emitted from the second light source. A carrier, has the light sources and the reflectors arranged thereon, and a lens, for projecting light emitted from the light sources and reflected by the corresponding reflectors. The lens is configured to correspondingly form light distributions associated with the reflecting surfaces of the first reflector and the second reflector, and the first light source, the first reflector, the second light source and the
(Continued)

second reflector are arranged on the same mounting surface of the carrier.

20 Claims, 6 Drawing Sheets

(51) Int. Cl.

| | |
|---|---|
| ***F21S 43/14*** | (2018.01) |
| ***F21S 43/20*** | (2018.01) |
| ***F21S 43/31*** | (2018.01) |
| *F21Y 115/10* | (2016.01) |

(52) U.S. Cl.
CPC ......... *F21S 43/26231* (2024.05); *F21S 43/31* (2018.01); *F21Y 2115/10* (2016.08)

(56) References Cited

U.S. PATENT DOCUMENTS

| | | | |
|---|---|---|---|
| 2015/0138822 | A1 | 5/2015 | Tatsukawa |
| 2018/0187851 | A1 | 7/2018 | Hossfeld |
| 2021/0088196 | A1 | 3/2021 | Mun |
| 2021/0231279 | A1 | 7/2021 | Ohashi et al. |
| 2021/0332964 | A1 | 10/2021 | Giraud |
| 2022/0163181 | A1 | 5/2022 | Giraud |

FOREIGN PATENT DOCUMENTS

| | | | |
|---|---|---|---|
| JP | 2009-199938 | A | 9/2009 |
| JP | 2012-238450 | A | 12/2012 |
| JP | 2012-238451 | A | 12/2012 |
| JP | 2018-110101 | A | 7/2018 |
| WO | WO 2020/025171 | A1 | 2/2020 |

OTHER PUBLICATIONS

Office Action dated Jan. 21, 2025, in the corresponding Japanese Patent Application No. 2023-580908 (with English-Translation), 10 pages.

LIGHT-EMITTING MODULE AND VEHICLE

TECHNICAL FIELD

The present invention relates to a light-emitting module and a vehicle.

BACKGROUND ART

Various light-emitting modules are known in the prior art for use in motor vehicles to generate lighting beams, signal beams, or a combination thereof.

For example, document CN102460002B discloses a lighting module for motor vehicles. The lighting module comprises: two concave reflectors, each having a first focal point and a second focal point, so that most of the light leaving the corresponding first focal point and reflected by the corresponding concave reflector converges toward the corresponding second focal point, wherein a reflecting surface of one of the concave reflectors is oriented toward a reflecting surface of the other concave reflector; a shielding piece, provided on a plane essentially between the two concave reflectors, having a first surface and a second surface facing the reflecting surface of the corresponding concave reflector, and further comprising a cut-off edge that connects the first surface and the second surface; and an optical element, comprising a focal point located on a plane that is perpendicular to the optical axis of the lighting module and passes through the cut-off edge. The cut-off edge of the lighting module is located at the second focal points of the two concave reflectors.

In lighting modules of the above type, high positioning accuracy is required. In addition, especially when the two concave reflectors are arranged on top of each other, a given installation dimension needs to be reserved in the height direction due to the structural size of the concave reflectors.

BRIEF SUMMARY OF THE INVENTION

Therefore, the purpose of the present invention is to provide a light-emitting module that can at least partially overcome the above disadvantages.

According to a first aspect of the present invention, a light-emitting module for vehicles is proposed, which has a main light exit direction and comprises: a first light source, used for a first light function; a first reflector, assigned to the first light source, for receiving and reflecting light emitted from the first light source along the main light exit direction; a second light source, used for a second light function; a second reflector, assigned to the second light source, for receiving and reflecting light emitted from the second light source along the main light exit direction; a carrier, with the first light source, the first reflector, the second light source and the second reflector arranged thereon; and a lens, which projects light emitted from the first light source and the second light source, wherein the lens is configured to correspondingly form light distributions associated with reflecting surfaces of the first reflector and the second reflector, and the first light source, the first reflector, the second light source and the second reflector are arranged on a same mounting surface of the carrier.

In the proposed light-emitting module, by arranging the light sources and corresponding reflectors for different light functions on the same side of the carrier, it is possible to effectively reduce the overall height of the light-emitting module, thereby achieving a compact size. Here, "a light function" may be understood as the lighting function or the signalling function.

According to the embodiments of the present invention, the lens is in one piece and has sections assigned to corresponding reflectors, and the sections have corresponding focusing region and an optical axis corresponding to the main light exit direction. Preferably, the focusing region may be a focus line. Therefore, it is possible to match the corresponding lens section with the assigned reflector by individually designing each lens section, thereby adjusting light emitted from the light sources and forming light distributions associated with the reflecting surfaces of related reflectors.

According to the embodiments of the present invention, with reference to the propagation direction of light along the main light exit direction, a reflecting surface of the corresponding reflector has a front edge and a rear edge, wherein, in the operation position of the light-emitting module, the front edge is associated with the lower part of the light distributions, and the rear edge is associated with the upper part of the light distributions, wherein the focusing region is located at or near the rear edge of the reflecting surface of the corresponding reflector; and/or the focusing region is located in or near the middle part between the front edge and the rear edge of the reflecting surface of the corresponding reflector. For this, the focusing regions may fall in a spatial range where their distance to a rear edge and/or the middle part is less than 10 mm, preferably less than 5 mm. In other words, it is feasible as long as the focusing regions fall at or near the rear edges or middle part, and thereby it is also feasible that the focusing regions are located in front of, behind, or on the left or right of the rear edges or middle part. In this way, it is also possible to form clear light distributions for corresponding light functions. Therefore, in this embodiment, the light-emitting module is insensitive to the positioning tolerance of the light sources relative to the reflecting surfaces, and it is only necessary to ensure that the reflecting surfaces of the reflectors are within the tolerance range relative to the lens, which is advantageous for manufacturing and assembling.

According to the embodiments of the present invention, the light function is selected from a low beam function, a high beam function, and a signalling function. Thus, for example, the first light function is a low beam function, the second light function is a high beam function, or additionally a third signalling function is provided. Therefore, in the state where the light-emitting module is installed in a vehicle, compared with the prior art, the light-emitting area having a smaller size in the vertical direction of the vehicle can be used for a plurality of light functions simultaneously, which is advantageous for meeting the requirements on light distribution for vehicle lamps of compact sizes.

According to the embodiments of the present invention, at least one of the first light source and the second light source is provided with a shield, and the shield is arranged in front of the light source along the light propagation direction of the main light exit direction, wherein the shield is preferably opaque. By providing a shield, the light from the light sources that is not reflected by the reflectors can be received, so as to prevent interference from such light. Especially for low beam light distributions with a cut-off line, it is not desirable that the area above the cut-off line is illuminated. A preferably opaque shield can absorb the light it receives. Of course, the shield may also be a reflective one to reflect light, for example, towards other light absorbing regions.

According to the embodiments of the present invention, the mounting surface forms an inclination angle relative to the main light exit direction, and the inclination angle is less than or equal to 20°, preferably less than or equal to 15°, preferably less than or equal to 10°, and preferably less than or equal to 5°. When the light-emitting angle of the light source is not 180°, in this layout, the light source can better illuminate the rear edge of a reflecting surface or the area immediately behind the rear edge.

According to the embodiments of the present invention, the minimum distance between the rear edges and the light sources is in the range of 1 mm to 5 mm. This makes possible a compact structure while ensuring that the reflecting surfaces are illuminated.

According to the embodiments of the present invention, the first light source and the second light source are semiconductor light sources. The semiconductor light sources may be light-emitting diodes, for example, white, yellow, and red light-emitting diodes, or light-emitting diodes that emit light of other colours. Light-emitting diodes are readily available on the market and are easy to assemble. Such a light source may emit light in a half space defined by the mounting surface, wherein the light source may, for example, have a light emission angle of 120° in this half space.

According to the embodiments of the present invention, the first light source and the second light source are arranged on a printed circuit board, preferably near an edge of the printed circuit board. This can, for example, reduce the size of the printed circuit board.

According to the embodiments of the present invention, the printed circuit board has a notch for the shield. The shield for the light source can pass through and protrude from the notch in the printed circuit board, so that the shield can be as close as possible to the assigned light source. Here, the notch may be provided in surface area of the printed circuit board body, or at an edge of the printed circuit board body. In the latter case, the notch forms at depressions at the edge of the printed circuit board body.

According to the embodiments of the present invention, the reflecting surfaces of the reflectors have a parabolic contour or an elliptical contour. Therefore, they can be formed by rotating a parabolic contour or an elliptical contour about an axis. The axis corresponds to the optical axis of the lens. When the reflecting surface of the reflectors is a composite reflecting surface, i.e., when it comprises a plurality of portions, a single continuous reflecting surface forming each portion of the reflecting surface may have the parabolic or elliptical contour described above, and the portions may be staggered along the main light exit direction or the direction transverse to the main light exit direction. A reflecting surface or its portions may be asymmetrical surface. The reflecting surface of the reflectors may also be other free-form surfaces. Here, a "free-form surface" can generally be understood optically to be formed by curves and surfaces that freely changes in a complex manner, i.e., a so-called free-form curves and surfaces.

According to the embodiments of the present invention, the carrier is a one-piece component made of a heat dissipating material. As a result, the heat emitted by the light sources can be dissipated directly through the carrier into the surrounding environment, while the structure remains compact. In order to increase the heat dissipating area, fin structure may also be provided on the carrier.

According to the embodiments of the present invention, the carrier is provided with a partition, which extends vertically in the operation position of the light-emitting module and is preferably light absorbing, in order to prevent interference between light reflected by one reflecting surface or a portion thereof and light reflected by another reflecting surface or a portion thereof. Thus, the reflectors can be arranged in a more compact manner.

According to the embodiments of the present invention, the reflectors of the light-emitting module are implemented integrally. This can simplify positioning and assembling of the reflectors.

According to the embodiments of the present invention, the light-emitting module is a lighting and/or signalling module. The light-emitting module can produce: lighting beams, for example, a low beam, a high beam, etc.; signal beams, for example, beams for direction indication, positioning, braking, etc.; or lighting and indicator beams.

BRIEF DESCRIPTION OF THE FIGURES

The present invention is expounded in greater detail below with the aid of the drawings. In the drawings.

DETAILED DESCRIPTION OF THE EMBODIMENTS

Embodiments of the present invention will be described demonstratively below. As those skilled in the art should realize, the embodiments described may be amended in various ways without departing from the concept of the present invention. Accordingly, the drawings and the description are exemplary and not restrictive in nature. In the following text, identical drawing reference labels generally indicate functionally identical or similar elements.

Figure 1:
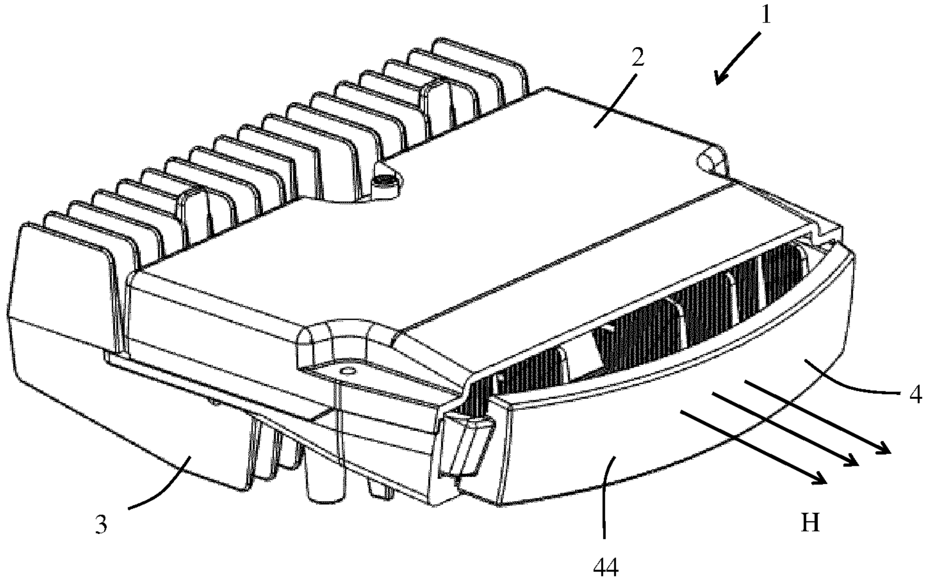
FIG. 1 is a 3D view of one embodiment of the light-emitting module according to the present invention.

FIG. 1 is a 3D view of the assembled light-emitting module 1 according to the present invention. The light-emitting module 1 mainly comprises a cover 2, a carrier 3, a lens 4, and a reflector unit and a light source unit that are arranged in the space defined by the above three parts but are not shown in FIG. 1. The light-emitting module 1 has a main light exit direction H. The above components of the light-emitting module 1 in FIG. 1 will be further described below with reference to FIG. 2 to FIG. 5. It can be seen that the output surface 44 of the lens 4 is a single continuous surface.

Figure 2:
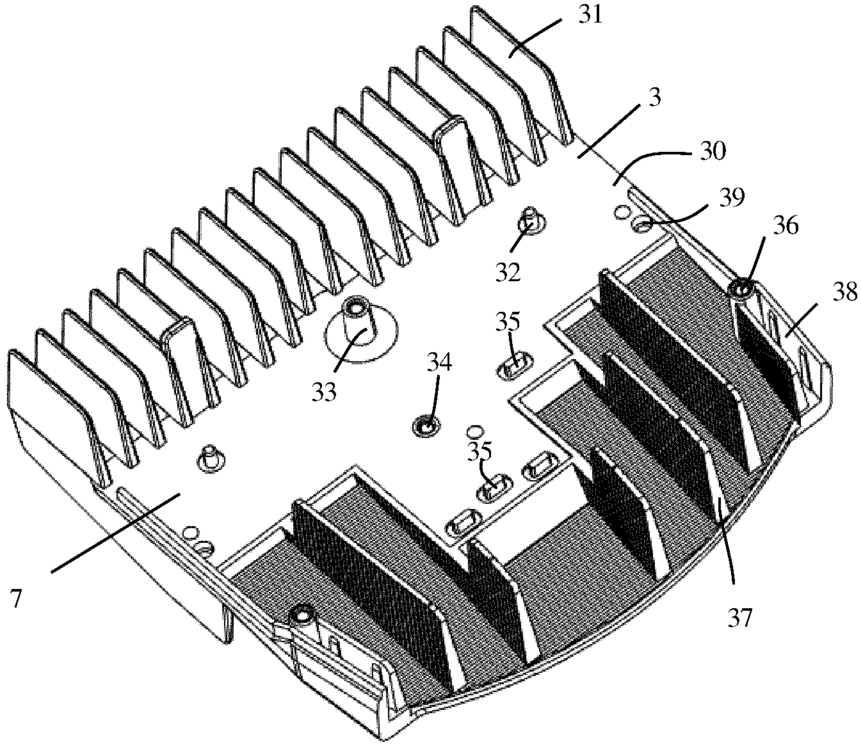
FIG. 2 shows the carrier of the light-emitting module in FIG. 1.

FIG. 2 shows the carrier 3 of the light-emitting module 1. The reflector unit 21, the light source unit 5 and the lens 4 may be arranged on the body 30 of the carrier 3. Therefore, the carrier 3 is provided with appropriate positioning mechanisms. Specifically, the carrier 3 has: a positioning hole 39 and a threaded hole 36 for the positioning pin 25 of the reflector unit 21, wherein a threaded piece can be screwed into the threaded hole 36 through the through hole 26 of the reflector unit 21; a positioning pin 32 and the threaded hole 34 for the light source unit 5, wherein the positioning pin 32 is accommodated in the hole 55 of the carrier 51 of the light source unit 5, and a threaded piece can be screwed into the threaded hole 34 of the carrier 3 through the hole 54 of the carrier 51; an accommodating groove 38, which is used to accommodate the positioning lug 41 of the lens 4.

The carrier 3 may also be provided with a shield 35 in the form of a protrusion. In the assembled state of the light-emitting module 1, the shield 35 is arranged in front of the relevant light source of the light source unit 5 in the main light exit direction of the light-emitting module 1, to block undesired light. The shield 35 is preferably opaque.

Additionally, in order to fix the carrier 3 on a bracket (not shown), a positioning mechanism 33 is provided, which may, for example, be in the form of a protrusion provided with threaded holes.

It should be noted that the above positioning mechanism is only exemplary, and other feasible positioning mechanisms may also be provided, including but not limited to bonding, clamping, welding, etc., as long as the above-mentioned components can be connected to each other.

The carrier 3 may be provided with a radiator 31 to dissipate the heat emitted by the light sources during operation to the surrounding environment. In order to increase the heat dissipating area, for example, the radiator 31 may be designed to have a plurality of fins.

The carrier 3 may also be provided with a partition 37, to prevent interference of light emitted from different light sources when working simultaneously in the case where light sources for different functions are arranged on the carrier 3. A plate-shaped partition 37 extending vertically is shown. Advantageously, the partition 37 is light absorbing, for example, provided with a light-absorbing layer.

In the example shown, the carrier 3 is implemented in one piece, i.e., the carrier 3 can integrally have the aforementioned positioning means, shield, radiator, partition or a combination thereof, etc., without the need of separate assembling afterwards. Therefore, especially when the carrier 3 is integrally provided with the above-mentioned positioning mechanisms, shield, radiator, and partition, the carrier 3 is preferably cast from a heat dissipating material, for example, aluminium, copper or their alloys, or other suitable materials. For example, in the case where the carrier 3 is formed by casting an aluminium alloy, sufficient strength, hardness and a light weight of the carrier can be ensured cost-effectively.

The light source unit 5 has light sources 50 and a connector 58 for electrically connecting the light sources 50 to an external power source.

The light source unit 5 shown comprises a printed circuit board 51, on which the light sources 50 and the connector 58 are arranged. The printed circuit board 51 is provided with the hole 54 and the hole 55 for positioning and fixing described above. In particular, the hole 55 for positioning can be, for example, a combination of a circular hole and an elliptical hole. Alternatively, in an example not shown, the light sources 50 of the light source unit 5 may be arranged directly on the carrier 3, especially when the carrier 3 is made of a heat dissipating metal material. Thus, the surface of the printed circuit board 51 or the corresponding surface of the carrier 3 directly mounted with the light sources 50 may form a mounting surface 7.

When the printed circuit board 51 is provided, the printed circuit board 51 is thermally connected to the carrier 3 or to the radiator 31. For this, a thermally conductive medium, for example, a thermally conductive paste or a thermally conductive sheet, etc., may be applied between the printed circuit board 51 and the radiator 31.

Figure 3:
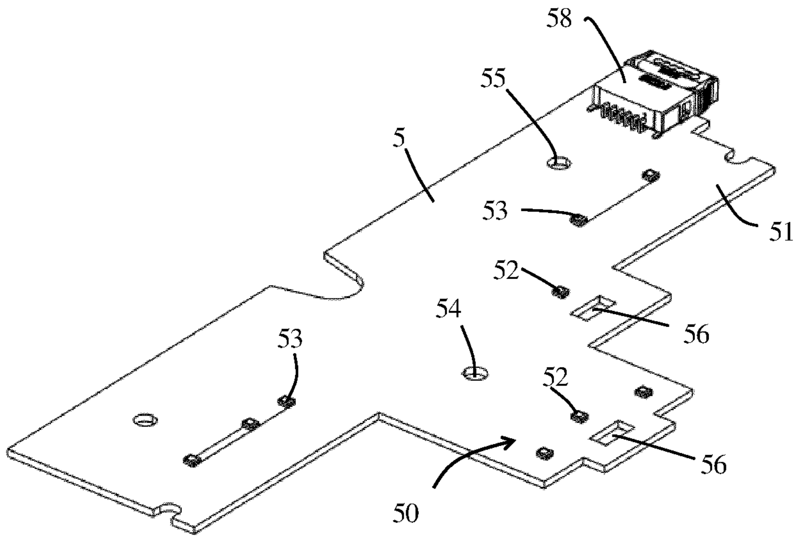
FIG. 3 shows the light source unit of the light-emitting module in FIG. 1.
Figure 6:
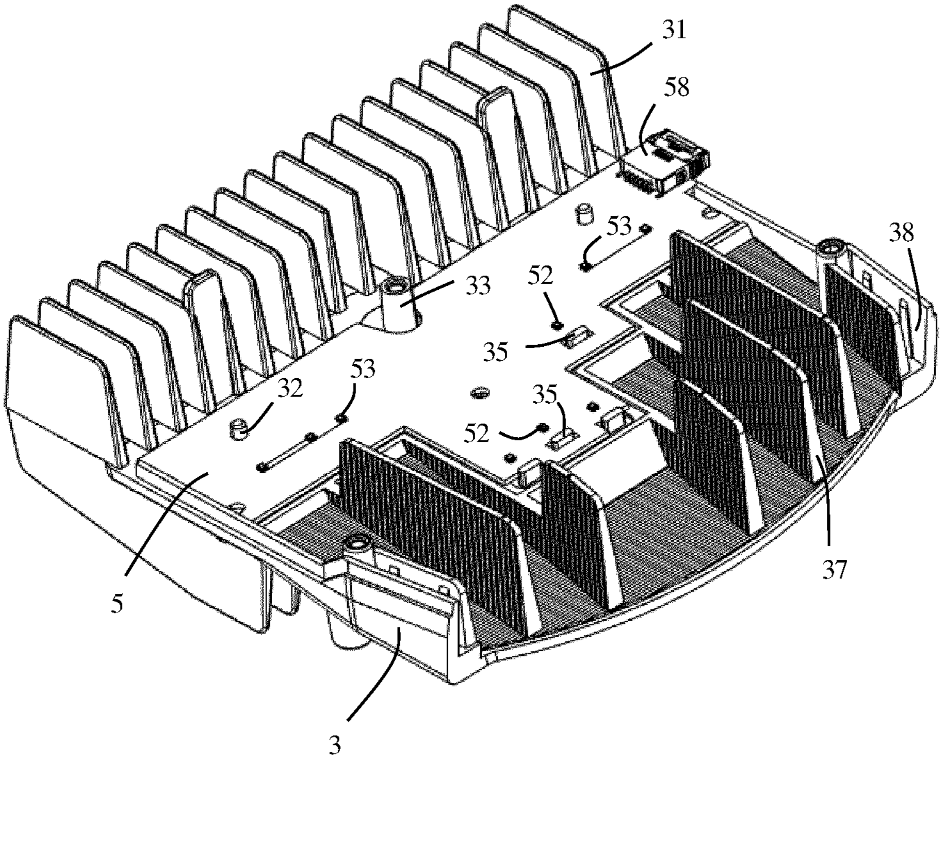
FIG. 6 shows the assembled carrier and light source unit of the light-emitting module in FIG. 1.

The light sources 50 are preferably mounted close to an edge of the mounting surface 7, as will be explained further below. In FIG. 3, with reference to the main light exit direction of the light-emitting module 1, the light sources 50 are arranged near the front edge of the printed circuit board 51, and the shape of the front edge is designed according to practical constraints. In order to minimize costs, it is preferable to have as small a size of the printed circuit board 51 as possible. The printed circuit board 51 has a notch 56 in front of some of the light sources for a shield 35, and the shield 35 can protrude from the notch 56, as can be seen particularly clearly in FIG. 6.

In order to implement different functions, the light sources 50 of the light source unit 5 may be divided into different groups. For example, the light sources 50 may have: a first light source 52, used for a first light function; a second light source 53, used for a second light function. Here, the corresponding light function may be the lighting function, the signalling function or a combination thereof. Therefore, it is not limited to the above-mentioned first light function and second light function, and light sources for a third light function, a fourth light function, etc. may also be provided. Exemplarily, the first function may be a low beam function, and the second function may be a high beam function; or the first function may be a low beam function, and the second function may be a direction indication function. Only a few examples are given here, and other combinations may be considered. The number of light sources used for each light function can be determined based on actual needs. In addition, the light sources of each light function may be staggered along the main light exit direction and/or in a direction transverse to the main light exit direction, in order to form a required light distribution.

Advantageously, the light sources 50 are semiconductor light sources, and in particular light-emitting diodes. The light colours of the light sources 50 may be determined as needed.

Figure 4:
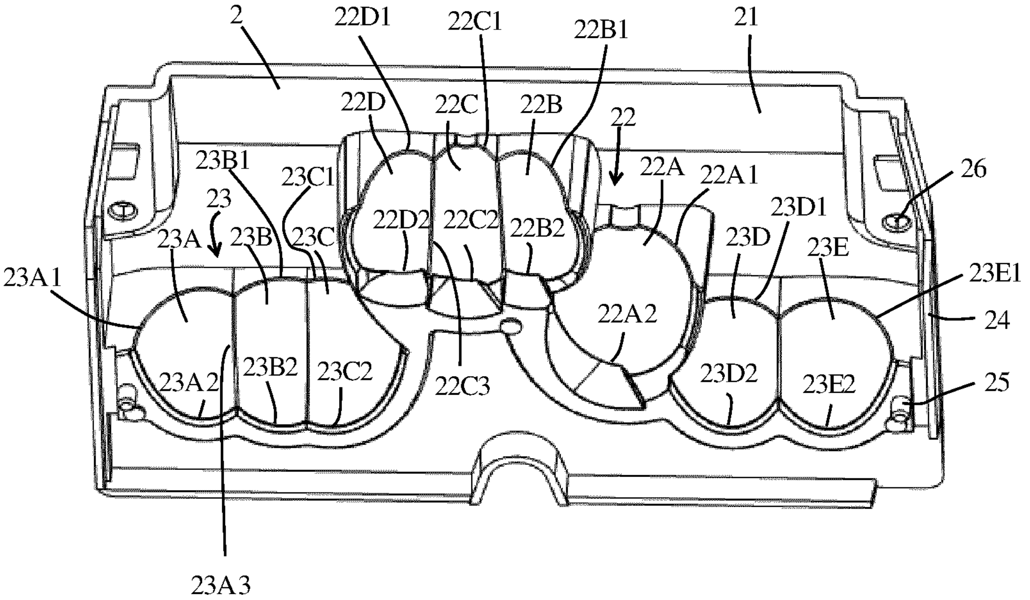
FIG. 4 shows the reflector unit of the light-emitting module in FIG. 1.

In order to direct the light emitted from the light sources 50 toward the lens 4, a reflector unit 21 is provided, which is assigned to the light source unit 5. FIG. 4 shows the reflector unit 21 formed on one side of the cover 2. In this case, for example, the reflector unit 21 may be formed by applying a metal coating, for example, an aluminium coating, to the corresponding side surface after injection moulding of the cover 2. Alternatively, the reflector unit 21 may also be provided separately and fixed on a carrier, wherein such a reflector unit 21 is preferably in one piece. The material forming the reflecting surface must have good heat resistance, being for example, glass or synthetic polymers such as polycarbonates or polyetherimide.

The reflector unit 21 may be divided into different reflectors corresponding to light sources for different light functions. For example, the reflector unit 21 may have: a first reflector 22, assigned to the first light source 52, for receiving and reflecting light emitted from the first light source 52 along the main light exit direction H; a second reflector 23, assigned to the second light source 53, for receiving and reflecting light emitted from the second light source 53 along the main light exit direction H. Each reflector may have a reflecting surface assigned to the corresponding light source, which may be a single continuous surface or a composite reflecting surface with a plurality of continuous sub-surfaces.

An example of a composite reflecting surface is shown in FIG. 4, i.e., the first reflector 22 has four reflecting surfaces 22A, 22B, 22C, and 22D for the four light sources of the first light function, and the second reflector 23 has five reflecting surfaces 23A, 23B, 23C, 23D, and 23E for the five light sources of the second light function, wherein all the reflecting surfaces are staggered. Of course, a larger number of light sources may also be assigned to each reflecting surface.

The reflecting surface of each reflector of the reflector unit 21 may have a parabolic contour or an elliptical contour formed by rotation, and the light sources may, for example, be arranged at the focal point of the above-mentioned reflecting surface, wherein a "reflecting surface" mentioned here should be understood as a single continuous surface as a reflecting surface, i.e., a section of a reflecting surface in the case of a composite reflecting surface with a plurality of continuous sub-surfaces. Of course, other forms of reflecting surfaces may also be considered.

Figure 5:
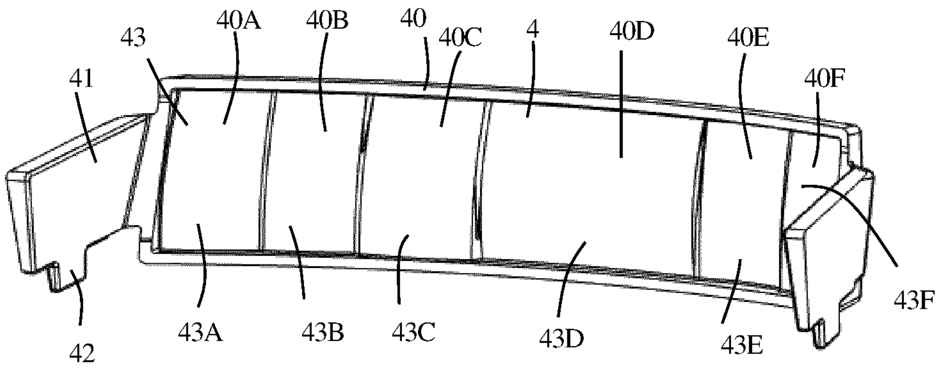
FIG. 5 shows the lens of the light-emitting module in FIG. 1.
Figure 10:
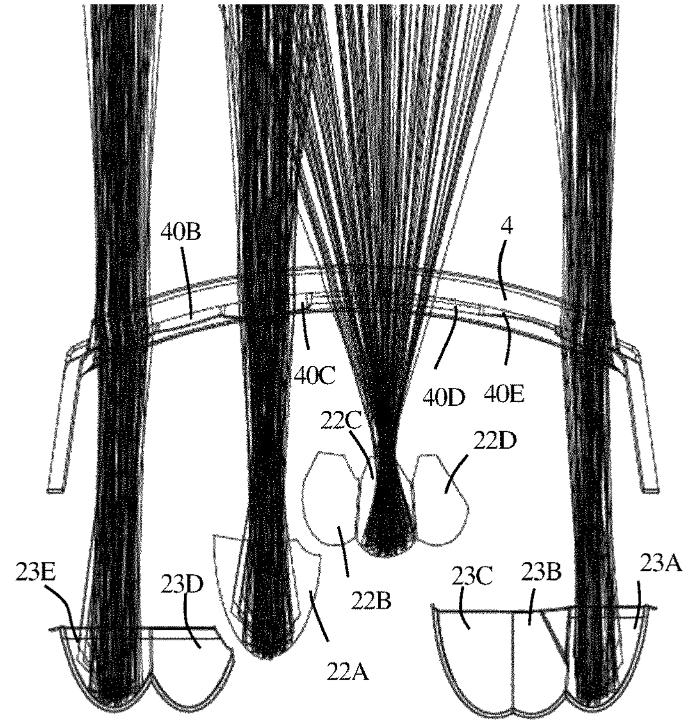
FIG. 10 is a simplified top view of the light-emitting module in FIG. 1, wherein the light reflected by the reflecting surfaces of the reflectors is shown partially.

The lens 4 is arranged to receive and project the light emitted from the light sources and reflected by the reflecting surfaces. The body 40 of the lens 4 has a discontinuous input surface 43 that can be divided into a plurality of portions. In the example of FIG. 5, the input surface 43 is divided into six portions 43A, 43B, 43C, 43D, 43E, and 43F, which are joined together and share a continuous output surface 44. Thus, the lens 4 can be regarded as being divided into six sections 40A, 40B, 40C, 40D, 40E, and 40F, which form sub-lenses and respectively work with different groups of light sources for each light function. That is, a single light source of the light sources for the same light function may work with a sub-lens described above individually or in combination. For example, in the example shown, with reference to the illustration of FIG. 10 (wherein only some of the lens sections are marked with reference numerals for a clearer display), the first light sources 52 for the first light function are divided into two groups, wherein one group has one light source, which is assigned to the section 40C, and the other group has three light sources, which are assigned to the section 40D; and each light source in the second light sources 53 for the second light function is assigned to one of the sections 40A, 40B, 40E, and 40F. In order to prevent interference of light from different groups of light sources when the light sources work simultaneously, a partition 37 is provided between the reflecting surface and the sub-lenses. It should be noted that the above division of the input surface of the lens 4 and the light sources is only exemplary, and different divisions may also be conceived based on the required light distribution. Each section of the lens 4 can be used to form a given area of a desired light distribution.

The individual sections of the lens 4 have their own optical axis 6, which corresponds to the main light exit direction of the light-emitting module.

The lens 4 is held in the accommodating groove 38 of the carrier 3 by the lug 41 connected to its body 40. The lug 41 may have a protrusion 42 that is inserted into the bottom of the accommodating groove 38, and the cover 2 may abut against the side of the lug 41 opposite to the protrusion 42 in the assembled state, thereby fixing the lens.

The lens 4 is preferably in one piece, for example, made of a transparent thermoplastic polymer such as polycarbonates or polymethyl methacrylate. The input and output surfaces of the lens may also be formed from silicone or other transparent materials depending on the desired refractive index.

Each sub-lens has its own focusing regions F1 and F2. The focusing region is preferably a focus line, which falls at the relevant reflecting surface. Accordingly, the lens 4 is configured to correspondingly form the light distribution associated with the reflecting surface of the relevant reflector. Specifically, in the example shown, with reference to the light propagation direction along the main light exit direction H, the reflecting surfaces 22A, 22B, 22C, 22D, 23A, 23B, 23C, 23D, and 23E of the corresponding reflectors 22 and 23 have front edges 22A1, 22B1, 22C1, 22D1, 23A1, 23B1, 23C1, 23D1, and 23E1 and rear edges 22A2, 22B2, 22C2, 22D2, 23A2, 23B2, 23C2, 23D2, and 23E2, wherein, in the operation position of the light-emitting module 1, the lens is configured as such that the front edges are associated with the lower part of light distributions and the rear edges are associated with the upper part of light distributions.

I. The focusing region F1 may be located at or near the rear edges 22A2, 22B2, 22C2, and 22D2 of the reflecting surfaces 22A, 22B, 22C, and 22D of the corresponding reflector 22, so that the front edges form the lower part of light distributions, and the rear edges form the upper part of light distributions, wherein the upper part forms the boundary of light distributions with respect to the area not illuminated by the beam; and/or II. The focusing region F2 may be located in or near the middle part between the front edges 23A1, 23B1, 23C1, 23D1, and 23E1 and the rear edges 23A2, 23B2, 23C2, 23D2, and 23E2 on the reflecting surfaces 23A, 23B, 23C, 23D, and 23E of the corresponding reflector 23, thus dividing a reflecting surface into an upper reflecting part 230 and a lower reflecting part 23U, and in this way the formed light distribution may be regarded as on the upper and lower sides of the optical axis 6 when the optical axis 6 of the corresponding sub-lens passes through the focusing region F2.

Therefore, in case I above, this is particularly suitable for forming the low beam function, for which it is only necessary to design the rear edge of a reflecting surface accordingly. In case II, this is particularly suitable for forming the high beam function or part of the high beam function, or other signal light functions.

Here, it should be noted that the focusing regions F1 and F2 fall in a range where their distance to the rear edges 22A2, 22B2, 22C2, and 22D2 and/or the middle part is less than 10 mm, preferably less than 5 mm.

Figure 7:
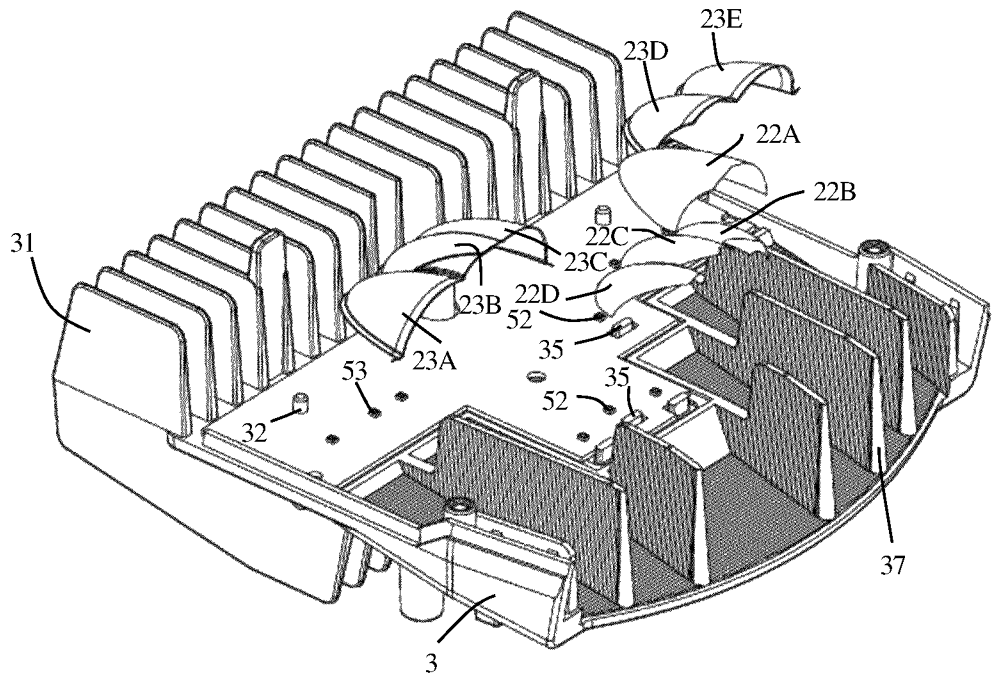
FIG. 7 is a simplified diagram of the assembled carrier, light source unit and reflector unit of the light-emitting module in FIG. 1.

Therefore, the light sources 50 and the reflector unit 21 can be arranged on the same mounting surface 7 of the carrier 3 (refer to FIG. 7). This in particular makes it possible to arrange the reflectors for the low beam function and the high beam function on the same side of the mounting surface, so that the light exit surface of the light-emitting module 1, i.e., the lens 4, can have a small height, for example, a height smaller than 25 mm or even smaller. For this, for the reflector 22 used to implement the low beam function, the focusing region of the corresponding sub-lens falls at or near the rear edge of a reflecting surface; for the reflector 23 used to implement the high beam function, the focusing region of the corresponding sub-lens is in or near the middle part between the front edge and the rear edge on a reflecting surface.

For some of the reflecting surfaces of the reflector for the low beam function, for example, the reflecting surfaces 22B, 22C, and 22D, the rear edges 22B2, 22C2, and 22D2 may have their projections extending straight on a plane perpendicular to the optical axis 6 of the sub-lens in the operation position of the light-emitting module 1, thereby forming a horizontal cut-off portion for the low beam distribution; the projection of the rear edge 22A2 of the other 22A of the reflecting surfaces in the plane perpendicular to the optical axis 6 of the sub-lens has two straight extension portions and a middle portion bridging the two straight extension portions. According to relevant regulations, the middle portion can be connected obliquely to the two straight extension portions that are staggered vertically, with an inclination angle of, for example, 15° or 45°; the two straight extension portions can also be collinear and connected through a middle portion curved upward or downward. In summary, the orientation of the rear edge of the reflecting surface of the reflector for the low beam function is designed according to the cut-off profile of the low beam distribution required by regulations.

When the reflecting surface of a reflector is used for other light functions, in particular the front and rear edges of the reflecting surface may be designed based on the shape of the desired light distribution in a way similar to the reflecting surface of the reflector for the low beam function described above.

For a single continuous reflecting surface of a reflector, the rear edge forming an edge of the reflecting surface may have its extension directly connected to the front edge on a plane where the rear edge is located, or may be connected to the front edge through a middle edge on another plane. As can be clearly seen in FIG. 4, the reflecting surface 22C has a middle edge 22C3 between its front edge 22C1 and rear edge 22C2, and the middle edge 22C3 is not coplanar with either of the front edge 22C1 or the rear edge 22C2; the rear edge 23A2 of the reflecting surface 23A extends on one side to intersect the front edge 23A1, and is connected to the front edge 22A1 through the middle edge 23A3 on the other side. In other words, a reflecting surface can be designed flexibly to match the final light distribution required.

Figure 8:
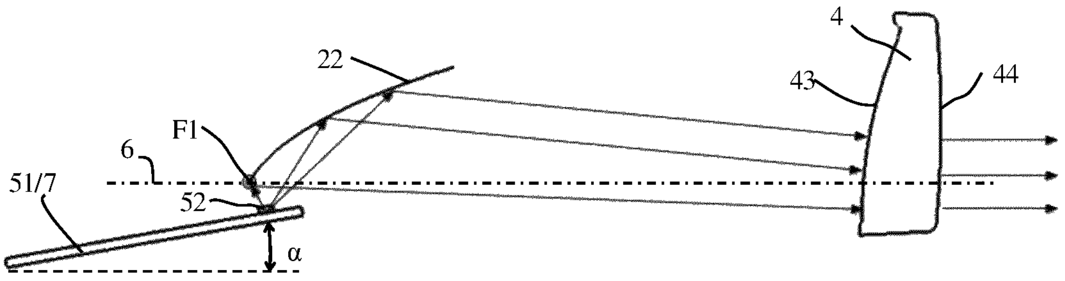
FIG. 8 is a schematic beam path diagram of the light-emitting module in FIG. 1.
Figure 9:
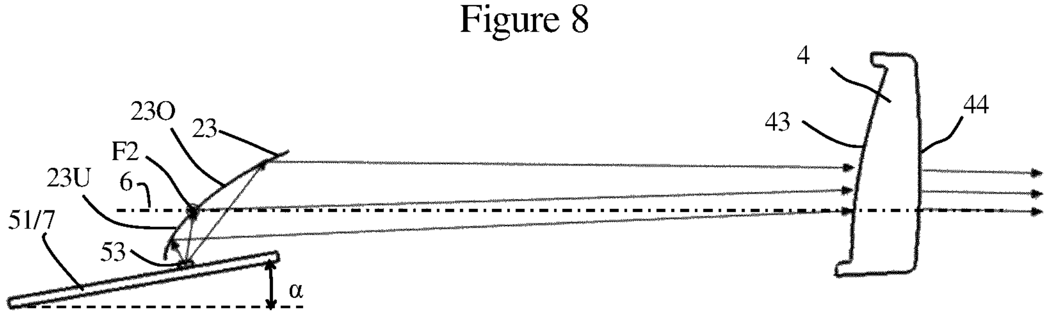
FIG. 9 is another schematic beam path diagram of the light-emitting module in FIG. 1.

In addition to arranging mounting surface 7 parallel to the main light exit direction of the light-emitting module, FIG. 7 and FIG. 8 show one embodiment of the light-emitting module 1, wherein the mounting surface 7 is inclined relative to the optical axis 6, and the mounting surface 7 is formed by the printed circuit board 51 or the carrier 3 assembled with light sources. The inclination angle $\alpha$ between the mounting surface 7 and the optical axis 6 is less than or equal to 20°, preferably less than or equal to 15°, preferably less than or equal to 10°, and preferably less than or equal to 5°. In this layout, when the light-emitting angle of the light source is not 180°, the light source can better illuminate the rear edge of a reflecting surface or the area immediately behind the rear edge.

The minimum distance between the rear edges and the light sources is in the range of 1 mm to 5 mm. This makes possible a compact structure while ensuring that the reflecting surfaces are illuminated.

Figure 11:
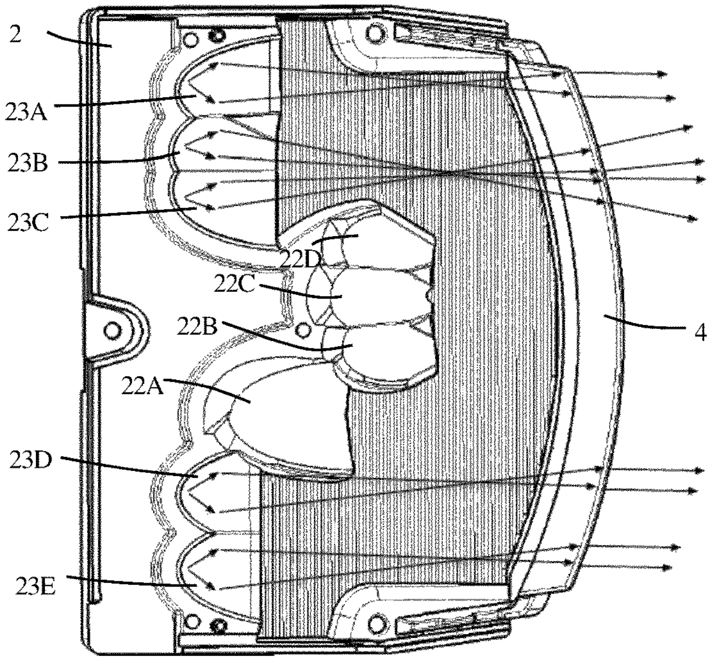
FIG. 11 is a bottom view of the reflector unit of the light-emitting module in FIG. 1, wherein the light reflected by some of the reflecting surfaces of the reflector unit is shown.
Figure 12:
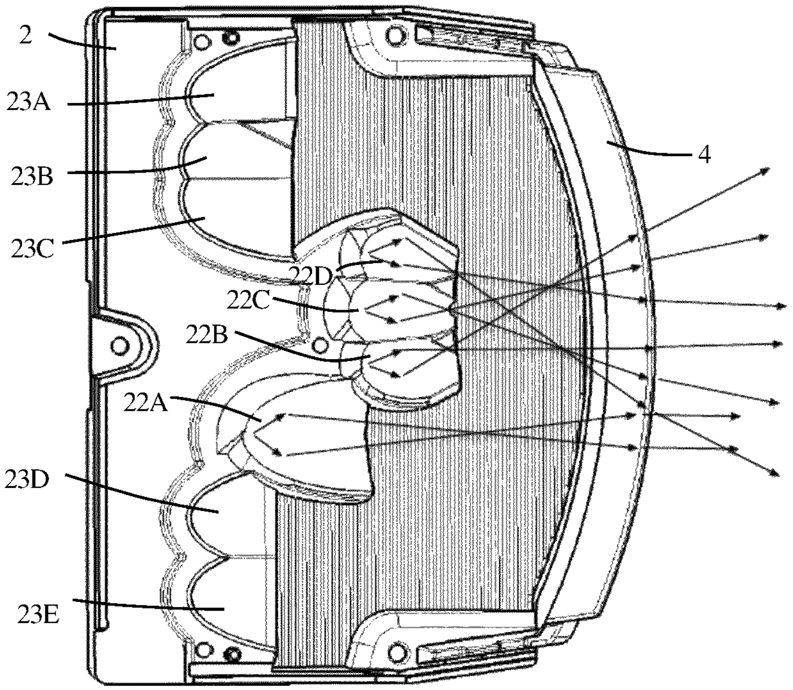
FIG. 12 is a bottom view of the reflector unit of the light-emitting module in FIG. 1, wherein the light reflected by the other reflecting surfaces of the reflector unit is shown.

FIG. 11 and FIG. 12 show the beam path in the case of a single continuous reflecting surface with an elliptical contour. It can be seen that, beams emitted from the light sources and reflected by the reflecting surfaces converge at a point near the relevant section of the lens, thereby reducing the width of the beams on the incident surface of the lens.

The light-emitting module according to the present invention may be used as a lighting and/or signalling module in a vehicle lamp. Therefore, the light-emitting module can produce: lighting beams, for example, a low beam, a high beam, etc.; signal beams, for example, beams for direction indication, positioning, braking, etc.; or lighting and indicator beams.

The present invention, instead of being limited to the above-described structure, may also have other variants. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

The invention claimed is:

1. A light-emitting module for vehicles, the light-emitting module having a main light exit direction and having:

a first light source, used for a first light function;

a first reflector, which receives and reflects light emitted from the first light source along the main light exit direction;

a second light source, used for a second light function;

a second reflector, which receives and reflects light emitted from the second light source along the main light exit direction;

a carrier, with the first light source, the first reflector, the second light source and the second reflector arranged thereon; and a lens having a continuously curved output surface and a discontinuous input surface divided into sections corresponding to reflecting surfaces of the first and second reflectors, which projects light emitted from the first light source and the second light source and reflected by the corresponding reflectors, wherein the lens is configured to correspondingly form light distributions associated with the reflecting surfaces of the first reflector and the second reflector, and the first light source, the first reflector, the second light source and the second reflector are arranged on a same mounting surface of the carrier.

2. The light-emitting module according to claim 1, wherein the lens is in one piece and has sections assigned to corresponding reflectors, and the sections have corresponding focusing regions and optical axis corresponding to the main light exit direction.

3. The light-emitting module according to claim 2, wherein, with reference to the propagation direction of light along the main light exit direction, a reflecting surface of the corresponding reflector has a front edge and a rear edge, wherein, in the operation position of the light-emitting module, the front edge is associated with a lower part of the light distributions, and the rear edge is associated with an upper part of the light distributions, wherein the focusing regions or region are or is located at or near the rear edges of the reflecting surfaces of the corresponding reflectors; and/or the focusing regions or region are or is located in or near the middle part between the front edge and the rear edge of the reflecting surfaces of the corresponding reflectors.

4. The light-emitting module according to claim 3, wherein the focusing regions fall in a spatial range where their distance to a rear edge and/or the middle part is less than 10 mm.

5. The light-emitting module according to claim 3, wherein the first light function and the second light function respectively include one or more of a low beam function, a high beam function, and a signaling function.

6. The light-emitting module according to claim 3, wherein at least one of the first light source and the second light source is provided with a shield, and the shield is arranged in front of the corresponding light source with reference to the main light exit direction, in order to receive light from the light source that propagates forward along the main light exit direction and is not reflected by the reflecting surfaces, wherein the shield is opaque.

7. The light-emitting module according to claim 3, wherein the mounting surface forms an inclination angle ($\alpha$) relative to the main light exit direction, and the inclination angle is less than or equal to 20°.

8. The light-emitting module according to claim 3, wherein the minimum distance between the rear edges and the light sources is in the range of 1 mm to 5 mm.

9. The light-emitting module according to claim 2, wherein the focusing regions are focus lines.

10. The light-emitting module according to claim 2, wherein the reflecting surface of the reflector has a parabolic contour or an elliptical contour.

11. The light-emitting module according to claim 1, wherein the first light source and the second light source are semiconductor light sources.

12. The light-emitting module according to claim 11, wherein the first light source and the second light source are arranged on a printed circuit board and near an edge of the printed circuit board.

13. The light-emitting module according to claim 12, wherein the printed circuit board has a notch for the shield.

14. The light-emitting module according to claim 1, wherein the reflecting surface of the reflector has a parabolic contour or an elliptical contour.

15. The light-emitting module according to claim 1, wherein the carrier is a one-piece component made of a heat dissipating material.

16. The light-emitting module according to claim 1, wherein the carrier is provided with a partition, and the partition extends vertically in the operation position of the light-emitting module and is light absorbing.

17. The light-emitting module according to claim 1, wherein the reflectors or reflector of the light-emitting module are or is implemented integrally.

18. The light-emitting module according to claim 1, wherein the light-emitting module is a lighting and/or signaling module.

19. A vehicle, wherein the vehicle has a light-emitting module according to claim 1.

20. The light-emitting module according to claim 1, wherein the first reflector includes a plurality of reflecting surfaces and the plurality of reflecting surfaces are staggered on the carrier along the main light exit direction or a direction transverse to the main light exit direction.

* * * * *